United States Patent
Chhaya et al.

(10) Patent No.: US 10,296,546 B2
(45) Date of Patent: May 21, 2019

(54) AUTOMATIC AGGREGATION OF ONLINE USER PROFILES

(71) Applicant: Adobe Inc., San Jose, CA (US)

(72) Inventors: Niyati Chhaya, Maharashtra (IN); Deepak Pai, Karnataka (IN); Dhwanit Agarwal, Uttar Pradesh (IN); Nikaash Puri, New Delhi (IN); Paridhi Jain, Rajasthan (IN); Ponnurangam Kumaraguru, New Delhi (IN)

(73) Assignee: Adobe Inc., San Jose, CA (US)

( * ) Notice: Subject to any disclaimer, the term of this patent is extended or adjusted under 35 U.S.C. 154(b) by 1033 days.

(21) Appl. No.: 14/551,365

(22) Filed: Nov. 24, 2014

(65) Prior Publication Data

US 2016/0147758 A1    May 26, 2016

(51) Int. Cl.
| | |
|---|---|
| G06F 16/00 | (2019.01) |
| G06F 16/9535 | (2019.01) |
| H04L 29/08 | (2006.01) |
| G06F 16/435 | (2019.01) |
| G06F 16/335 | (2019.01) |

(52) U.S. Cl.
CPC ........ G06F 16/9535 (2019.01); G06F 16/337 (2019.01); G06F 16/437 (2019.01); H04L 67/306 (2013.01)

(58) Field of Classification Search
CPC ......... G06F 17/30867; G06F 17/30035; G06F 17/30702; G06F 16/9535; G06F 16/337; G06F 16/437; H04L 67/306
USPC ........................................................ 707/733
See application file for complete search history.

(56) References Cited

U.S. PATENT DOCUMENTS

| | | | | |
|---|---|---|---|---|
| 8,346,746 | B2* | 1/2013 | Lakshmanan | G06F 16/9535 |
| | | | | 707/705 |
| 8,364,708 | B1* | 1/2013 | Braytenbaum | G06F 16/9535 |
| | | | | 707/776 |
| 9,654,594 | B2* | 5/2017 | B'Far | H04L 63/102 |
| 2004/0128156 | A1* | 7/2004 | Beringer | G06Q 10/06313 |
| | | | | 705/319 |
| 2007/0239722 | A1* | 10/2007 | Phillips | G06F 16/9535 |

(Continued)

OTHER PUBLICATIONS

Cook, et al., "Distributed Ray Tracing," Computer Graphics, vol. 18, No. 3. Jul. 1984. pp. 137-145.

Primary Examiner — Thanh-Ha Dang
(74) Attorney, Agent, or Firm — Finch & Maloney PLLC

(57) ABSTRACT

Techniques are disclosed for identifying the same online user across different communication networks, and further creating a unified profile for that user. The unified profile is an aggregation of publicly available user profile attributes across the different networks. In an embodiment, the techniques are implemented as a computer implemented methodology, including: (1) feature space analysis to identify relevant user features that allows for clusterization of the given target network(s), (2) unsupervised candidate selection to identify one or more candidate user profiles from each target network and that are likely belonging to a target user or so-called queried user, and (3) supervised user identification to identify a likely matching user profile for that target user from each target network. A unified user profile can then be built from data taken from all matched user profiles, and effectively allows a marketer to better understand that user and hence execute more informed targeting.

20 Claims, 8 Drawing Sheets

(56) References Cited

U.S. PATENT DOCUMENTS

| | | | | |
|---|---|---|---|---|
| 2009/0164442 A1* | 6/2009 | Shani | .................... | G06F 16/335 |
| 2011/0137941 A1* | 6/2011 | Hoffman | ............. | G06F 16/9535 |
| | | | | 707/779 |
| 2012/0254184 A1* | 10/2012 | Choudhary | ........ | G06Q 30/0201 |
| | | | | 707/738 |
| 2013/0132358 A1* | 5/2013 | Nikankin | ............... | G06Q 40/02 |
| | | | | 707/706 |
| 2013/0325858 A1* | 12/2013 | Xu | .................... | G06F 17/30867 |
| | | | | 707/730 |
| 2014/0215507 A1* | 7/2014 | Wouhaybi | .............. | G06Q 30/02 |
| | | | | 725/14 |
| 2014/0278821 A1* | 9/2014 | McConnell | ........ | G06Q 10/0639 |
| | | | | 705/7.38 |
| 2014/0324965 A1* | 10/2014 | Ralston | ................. | H04L 67/306 |
| | | | | 709/204 |
| 2014/0337091 A1* | 11/2014 | Fort | .................. | G06Q 30/0241 |
| | | | | 705/7.29 |
| 2014/0379681 A1* | 12/2014 | Puligundla | .......... | G06F 16/9535 |
| | | | | 707/706 |
| 2015/0019547 A1* | 1/2015 | Thalapathy | ......... | G06F 16/9535 |
| | | | | 707/732 |
| 2015/0254248 A1* | 9/2015 | Burns | ............... | G06F 16/24578 |
| | | | | 707/749 |
| 2015/0334458 A1* | 11/2015 | Srinivasan | ........... | H04N 21/482 |
| | | | | 725/14 |
| 2016/0132198 A1* | 5/2016 | Sinclair | ................ | H04L 67/306 |
| | | | | 715/739 |

* cited by examiner

| Type | Raw Feature | Availability | | | | Extracted Feature |
|---|---|---|---|---|---|---|
| | | Network #1 | Network #2 | Network #3 | Network #4 | |
| Profile | Username | X | X | X | X | Jaro distance<br>LCS length<br>Levenshtein distance<br>Length difference<br>Char unigram Jaccard index<br>Char bi-gram Cosine similarity<br>Entropy difference |
| | Name | X | X | X | X | Jaro distance<br>LCS length<br>Levenshtein distance<br>Length difference<br>Char unigram Jaccard index<br>Char bi-gram Cosine similarity<br>Entropy difference |
| | Location | X | - | X | X | Ratio of common locations<br>Ratio of common postal codes |
| | Bio | X (description) | X | X (occupation + description) | X (summary) | Bio length difference<br>Bio words distribution<br>POS tags distribution<br>Jaccard index of bio words<br>Cosine similarity of bio words<br>Ratio of misspelled words |
| | Profile Image | X | X | X | X | Histogram similarity<br>Face similarity |
| | Gender | - | X | - | - | Boolean |
| | Language | X | X (from locale) | - | - | Boolean |
| Content | Posts | X | X | X | - | Activity distribution<br>Device distribution<br>Application distribution<br>Avg. # of URLs shared<br>POS tags distribution<br>Avg. # of multimedia shared<br>Avg. # of words<br>Avg. # of misspelled words<br>Avg. length of words |

Fig. 3

| Profile Image #1 | | Profile Image #2 |

| Attribute | Value |
| --- | --- |
| Name | Rick James |
| Gender | Male |

| Attribute | Value |
| --- | --- |
| Locale | U.S. |
| Followers | 377 |
| Location | Palo Alto, CA |
| Friends | 185 |
| Description | Geek. Guitar player. Stones fan. Password breaker. Father. |
| Headline | Hardware engineer. Designer |
| Area Name | Silicon Valley Area |
| Summary | Hardware engineer with deep design and implementation skills for realizing conceptual jibber jabber into usable technology. Currently building time machine configured to seamlessly move company personnel from meeting to meeting to improve meeting production by over 50%. My colleagues really seem to like me. |
| Area Name | California, Bay Area |
| Bio | Owner and developer at G-dunkDesign, Inc, an independent hardware design company. Worked in FPGA and ASIC design for most of my career. Now contracting and working on circuit and design services for functional implementation shops. |
| Occupation | Principle and Designer, G-dunkDesign, Inc. |

Fig. 8

AUTOMATIC AGGREGATION OF ONLINE USER PROFILES

FIELD OF THE DISCLOSURE

This disclosure relates to techniques for aggregating data from disconnected sources, and more particularly, to techniques for user profile aggregation across multiple online communication networks.

BACKGROUND

A typical user of online or so-called social networking applications oftentimes has various identities across different social networks. For instance, one social network may be for maintaining professional contacts and image, while another social network may be for maintaining contact with friends and family, while another social network may be for maintaining contact with other people having common interests or that are otherwise similarly situated, and so on. For each such social network that a user is engaged with, there is typically some set of user features or a so-called user profile that is publically available, such as a user's public Facebook® page and LinkedIn® profile page. The amount and type of information that is made public is generally up to the user. In addition, most social network providers further operate under some established privacy policy that restricts access to personally identifiable information of its users. In any case, online marketers can use public data to better understand how to market to a given individual. For instance, the marketer may wish to market goods or services or otherwise reach a given such user for a specific business purpose. However, for a marketer, the process of creating a user profile is restricted to one network at a time, as the information about multiple user accounts (profiles) is not easily accessible beyond a time-consuming manual online search and aggregation. Moreover, it may not be clear or otherwise conclusive that a given user on one network is the same person as a given user of another network.

BRIEF DESCRIPTION OF THE DRAWINGS

FIG. 3 shows a table including a list of profile features that can be used in the clusterization of a given search network in accordance with an embodiment of the present disclosure, along with the availability of those features across multiple networks.

FIG. 8 illustrates an example unified user profile, configured in accordance with an embodiment of the present disclosure.

DETAILED DESCRIPTION

Figure 1:
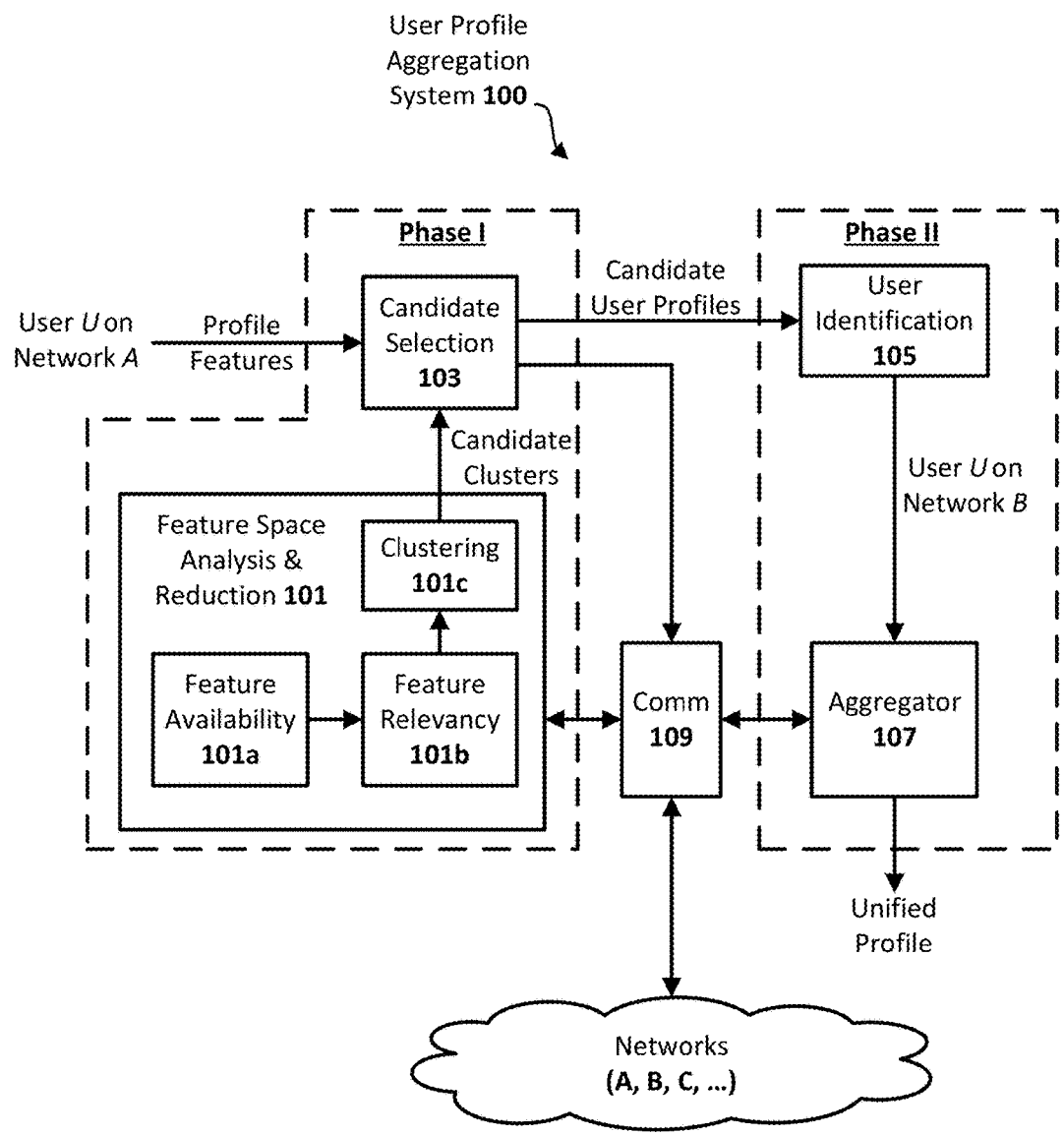
FIG. 1 illustrates a system framework for automatically generating a unified user profile, configured in accordance with an embodiment of the present disclosure.

Techniques are disclosed for identifying the same online user across different communication networks, and further creating a unified profile view for that user. The resulting unified profile is an aggregation of publicly available profile attributes across the different networks belonging to that individual, and effectively allows a marketer to better understand that user and hence execute more informed targeting. The aggregation is executed in an automatic fashion, so no target user input or opting-in to an aggregation service is required. The unified profile can be structured and presented to accentuate the marketer's perspective, effectively providing a user profile that efficiently presents actionable marketing intelligence. In accordance with an embodiment, the techniques are implemented as a computer implemented methodology, including (1) feature space analysis, (2) candidate selection, and (3) user identification. Feature space analysis identifies relevant user-specific features for the task of user aggregation and further establishes the merit of these candidate features for the given aggregation problem. Candidate selection can be implemented with unsupervised methods such as clustering and operates to reduce the user search space to identify a subset of the candidate features while trying to find a match of a given user on a different network. User identification predicts whether a pair of user profiles belongs to the same individual, and can be implemented using a supervised approach. The output of the user identification process is a ranked set of profiles that the input user is most likely to match. The best match can be selected. A unified user profile can then be built from the aggregated data of a user's matched profiles.

General Overview

As previously explained, a typical user of online social networking applications oftentimes has various identities across varied social networks. Due to the disconnected nature of the individual profiles of a given user on different networks, a given marketer is restricted from readily having a complete view of its customer, which can at times cause wrong or otherwise ill-advised decisions regarding targeted campaigns and advertisements. Further, the marketer is likely to miss important information about the user that is only available through a unified view. Some online networking services being offered allow a user to affirmatively opt-in to an aggregated approach (such as Klout®) where the user is expected to key in the various network identities used by the user. Such services can be problematic for a number of reasons. For instance, such services generally rely on the user's voluntarily given information and are typically undersubscribed, as compared to the individual networks. Other solutions are heuristic-based and thus rely on specific domain knowledge and very specific datasets, thereby restricting scalability to other domains and diverse datasets. In a more general sense, academic solutions tend to assume that searching through a complete social network is a trivial task which is not the case for practical applications.

Thus, and in accordance with an embodiment of the present disclosure, techniques are disclosed for identifying the same online user across different networks, and further creating a unified profile view that effectively allows a marketer to better understand its users and hence execute more informed targeting. The resulting unified profile is an aggregation of publicly available profile attributes across different communication networks belonging to the same individual. The aggregation is executed in an automatic fashion, so no target user input or opting-in to an aggregation service is required. As will be further appreciated in light of this disclosure, the unified profile can be structured and presented to accentuate the marketer's perspective, effectively providing a user profile that efficiently presents actionable marketing intelligence, in accordance with an embodiment.

In an embodiment, the techniques are implemented as a machine learning methodology, including feature space analysis, candidate selection, and user identification. The methodology is modular, in that feature space analysis and candidate selection can be executed as a first phase so as to be a precursor to the user identification of the second phase. Such modularity allows the search space to be reduced prior to performing the user identification and aggregation. These two phases together combine unsupervised and supervised approaches so as to provide a hybrid approach to automatic and scalable user profile aggregation. Each of feature space analysis and candidate selection (first phase), and user identification (second phase) is further discussed in turn.

Feature space analysis identifies relevant user-specific features for the task of user aggregation and further establishes the merit of these candidate features for the given aggregation problem. In one embodiment, the user-specific features can be generally divided into two types: profile features and content features. Profile features or characteristics of a given user tend to be consistent across communication networks. To this end, these invariant features can be used to capture the characteristic properties of the user. Example profile features include username and name, profile image or headshot, biographical information, geographic location, gender, and language. Content features can be captured from a user's posted content and generally refer to, for example, a user's topical interests, language, writing style, and post patterns retained across multiple networks. Example content features include posts, posting time, posting device, and posting application. Further details with respect to feature space analysis will be provided in turn.

Candidate selection reduces the user search space to identify a subset of the candidate features while trying to find a match of a given user on a different network. This selection process can be carried out, for example, using unsupervised methods such as clustering. In particular, distribution-based clustering methods such as canopy clustering and k-medioid clustering are used, in accordance with some embodiments. So, the input to this candidate selection process is a user profile (one or more user features) on one network and the different search network, and the resultant output is a subset of user profiles from the search network that are similar to the input user profile. This resulting subset of user profiles is generally referred to as the candidate profile set.

User identification predicts whether a pair of user profiles belongs to the same individual, and can be implemented using a supervised approach. In particular, the user identification process receives the candidate profile set as input and identifies the best matched profiles, with respect to the input user profile. In accordance with one embodiment, the supervised learning model is trained for two classes: a match class (where the user profiles are known to belong to the same person) and a no match class (where the user profiles are known to belong to distinct individuals). Although different classifiers can be used, the Random forest classifier has been shown to give relatively high matching accuracy for this supervised learning problem, in accordance with an embodiment. Another embodiment employs the Naive Bayes classifier. The output of the user identification process is a ranked set of candidate profiles that the input user profile is most likely to match. The best match can be selected. A unified user profile can then be built from the input user profile and the selected candidate user profile. This process can be repeated for any number of other networks to identify additional candidate user profiles and further update the unified user profile.

Thus, automated and scalable user aggregation is carried out using publicly available profile information, without any need for target user input or opting-in. The overall methodology is referred to as a hybrid process herein, as it includes both unsupervised and supervised processes. As will be further appreciated in light of this disclosure, the techniques are scalable in terms of type of data, in that the hybrid process works well for a plurality of different networks each associated with a different purpose and data types. The resulting unified profile for a given user having presence on multiple communication networks can be used by a marketer to understand that user (potential customer) in a more holistic manner, allowing that customer to be targeted more efficiently.

As will be further appreciated in light of this disclosure, while the hybrid approach across varied networks can be used for the purpose of user profile aggregation, it can also be more generally used for user clustering and subsequent search-based segmentation in any number of other applications where making a given search space easier to search is desired or otherwise beneficial. As will be further appreciated, a so-called social network as used herein is any online community of users wherein those users are allowed to have a public user profile that has one or more features associated with that user, such as a name, username, gender, profession, resume or biography like information, geographic location, profile image or icon representative of the user, language preference(s) of the user, writing content and writing style of the user, and other publicly available features. Such features form a profile of a user and can be aggregated from multiple networks.

System Framework

FIG. 1 illustrates a user profile aggregation system 100 configured in accordance with an embodiment of the present disclosure. As can be seen, the system 100 is depicted as a two-phased identity aggregation framework that generates a unified user profile. Phase I of the framework includes a candidate selection module 103 that receives input from a pre-processing block 101 generally referred to as feature space analysis and reduction (pre-processing for brevity). In this embodiment, the pre-processing block 101 includes a feature availably module 101a, a feature relevancy module 101b, and a clustering module 101c, and generally operates to reduce a given target network to a set of clusters that can be readily segmented using given search terms (e.g., a term representing a user-specific profile feature). The candidate selection module 103 further receives a set of profile features for a target or so-called queried user from an input network. Using the known profile features of the user, the candidate selection module 103 effectively segments the clustered target network previously generated by the pre-processing stage 101, thereby identifying or otherwise generating a set of candidate user profiles from the target network. Phase II of the framework includes a user identification module 105 that receives the set of candidate user profiles and operates to rank those candidate profiles thereby identifying the user profile from the target network that is most likely to be of the same user whose profile is given on the input network. In this example case, the output of the user identification module 105 is provided to an aggregator module 107 that receives or otherwise has access to the relevant user profile features, including the known profile from the input network and the profile from the target network identified as the best match. From this information, the aggregator module 107 generates a unified profile including features about the user from both networks. As can be further seen, the system includes a communication (Comm) module 109 configured to provide access to various external networks (A, B, C, etc) accessible via given network infrastructure such as the Internet and social networking websites located thereon (e.g., Twitter®, Facebook®, Quora®, LinkedIn®, and Instagram®, to name a few etc). The communication module 109 is further configured to allow for inter-module communication as shown, although any number of such communication schemes will be apparent in light of this disclosure.

Operation of the system 100 can best be understood with reference to a typical example scenario. Consider, for instance, two online social or other online communication networks A (say Facebook®) and B (say Twitter®) and a profile of user U on network A. The system 100 addresses the problem of finding a ranked candidate list of social profiles on network B that are most likely to be of the same user whose profile is given on network A. So, given a user profile a belonging to user U on network A and a set P of user profiles $b_1, b_2, b_3, \ldots, b_n$ on network B, the system 100 is configured to find $C \subseteq P$ and a function $f: C \to [0; 1]$ such that if $c \in C$, then c profile on network B is very likely to be a user profile of the same user U on network B, with $f(c)$ indicating the confidence of this likelihood. Greater values of $f(c)$ indicate greater confidence. In an embodiment, if confidence $f(c)$ is above an established threshold or otherwise sufficiently high, then that c profile on network B can be used to create a unified profile of user U. Any number of other clusterized networks can also be searched to find other profiles that can be used to further supplement the unified profile. Thus, the system 100 enables an online marketing organization to create a unified view of a given customer's overall online user profile by automatically aggregating features from individual user profiles of that customer, found across multiple diverse networks (A, B, C, . . . , etc), so that particular customer can be targeted more effectively for purposes of marketing, and without any need for customer input to that marketing organization.

Modules 101a, 101b, and 101c of the pre-processing block 101 are configured to analyze and clusterize a given target search space (e.g., network B). In particular, the feature availability module 101a is programmed or otherwise configured to identify content features that are useful for identity aggregation, and the feature relevancy module 101b is programmed or otherwise configured to determine a relevancy or weight for the identified features. The clustering module 101c receives the list of relevant features and generates clusters using that data. This clusterization can be carried out for a given network on a periodic basis and in advance of receiving any queries to the system. Hence, the clustered network is available when a query is eventually received by the candidate selection module 103. As will be appreciated in light of this disclosure, the clustering of relevant profile features effectively reduces computational cost during the candidate selection process at 103. In short, a clustered network is easier to search than an unclustered network. The output from this pre-processing block 101 is one or more clustered networks (A, B, C, etc) available for candidate selection carried out by the candidate selection module 103.

The candidate selection module 103 is programmed or otherwise configured to find the set of candidate user profiles on the target or so-called search network that are most likely to be the target user. This processing by candidate selection module 103 can also be thought of as user space segmentation based on the specific relevant features identified by the pre-processing block 101. So, assume a queried user U and his profile a on network A, whose identity is to be aggregated along with features F(a) and a set of user profiles $P=\{b_1, b_2, b_3, \ldots, b_n\}$ on network B. The candidate selection module 103 receives this queried user profile a and operates to find a relevant search space (segment) for the profile in the clusterized space of search network B. The output of the candidate selection module 103 is the set of candidate user profiles, $C(\subseteq P)$, such that these profiles are very likely to be of the same user U. The size of C is usually much lesser than size of P.

The user identification module 105 is programmed or otherwise configured to rank the candidate user profiles received from candidate selection module 103, so as to identify the best match of the target user U. In operation, the user identification module 105 receives the candidate set C of user profiles of the target search network, estimates a likelihood function $f: C \to [0; 1]$, and hence finds the match identity (the profile most likely to be of the same user U) for the queried user out of P.

As can further be seen in the example embodiment of FIG. 1, the best match output by the user identification module 105 is received by the aggregator module 107. The aggregator module 107 is programmed or otherwise configured to combine features of the various profiles of the target user into a unified user profile. So for instance, the aggregator module 107 operates to combine or aggregate profile features from profiles of the target user found on networks A and B, and to assemble those features in a desired configuration, such as one suitable for review by a marketer. In this example embodiment, the aggregator module 107 receives the candidate user profile features from the user identification module 105, and the known user profile from the candidate selection module 103 by way of the communication module 109. Other suitable data passing schemes will be apparent.

Note that other embodiments may include a different degree of integration or modularity, and the example depicted is provided to facilitate discussion and not intended to limit the functionality provided herein to a particular structure or system architecture. For instance, in other embodiments, the aggregator module 107 and the user identification module 105 may be integrated into a common module that provides comparable functionality. Numerous other configurations will be apparent in light of this disclosure. Each of the various components can be implemented in software, such as a set of instructions (e.g., C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various profile aggregation methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the profile aggregation functionality described herein. In a more general sense, any suitable combination of hardware, software, and firmware can be used.

In one example embodiment, each of the candidate selection module 103, user identification module 105, and aggregator module 107 is implemented with JavaScript or other downloadable code that can be provisioned in real-time to a client requesting access (via a browser) to an application server hosting an online user profile aggregation service. In a similar embodiment, the pre-processing block 101 and the clusterized network(s) may be accessible to a backend server configured to respond to client-based user profile aggregation requests. In another example embodiment, each of the pre-processing block 101, candidate selection module 103, user identification module 105, and aggregator module 107 is installed locally on the user's computing system, so as to provide a stand-alone user profile aggregation system that can access the various networks of interest. In still another embodiment, the various modules making up the system 100 can be partly implemented on the client-side and partly on the server-side. For example, each of the pre-processing block 101, candidate selection module 103, user identification module 105, and aggregator module 107 can be implemented on the server-side (such as a server that provides access to, for instance, a cloud-based user profile aggregation service or application), and an input module can be at least partly implemented in a client-side user interface (such as the Adobe® Social user interface or other suitable user interface) can be implemented on the client-side. In still other example embodiments, the user profile aggregation system 100 can be offered together with a given application (such as integrated with an online marketing application or user interface, or with any application that allows for or can otherwise utilize user profile aggregation), or separately as a stand-alone module (e.g., plugin or downloadable app) that can be installed on a user's computing system to effectively operate as an automatic profile aggregation system for a given application or a user-defined set of applications. Numerous such client-server and stand-alone arrangements will be apparent in light of this disclosure.

In one specific example embodiment, for instance, the user profile aggregation system 100 is integrated with the analysis block of the Adobe® Social application provided by Adobe Systems Incorporated. In general, Adobe® Social enables marketers to use social media data as an input to optimize interactions with their customers and prospects across all channels to achieve measurable business results. In one specific aspect, Adobe® Social allows a marketer or user to publish posts to dozens or hundreds of social media pages in a relatively easy manner. In addition, Adobe® Social allows custom audiences to be targeted based on, for example, demographic and geographic data to get the right text posts, images, videos, links, pictures and events to the right people at the right time. To this end, the system 100 could be used as part of the targeting process that is implemented within the Adobe® Social platform, in accordance with one embodiment.

Methodology

Figure 2:
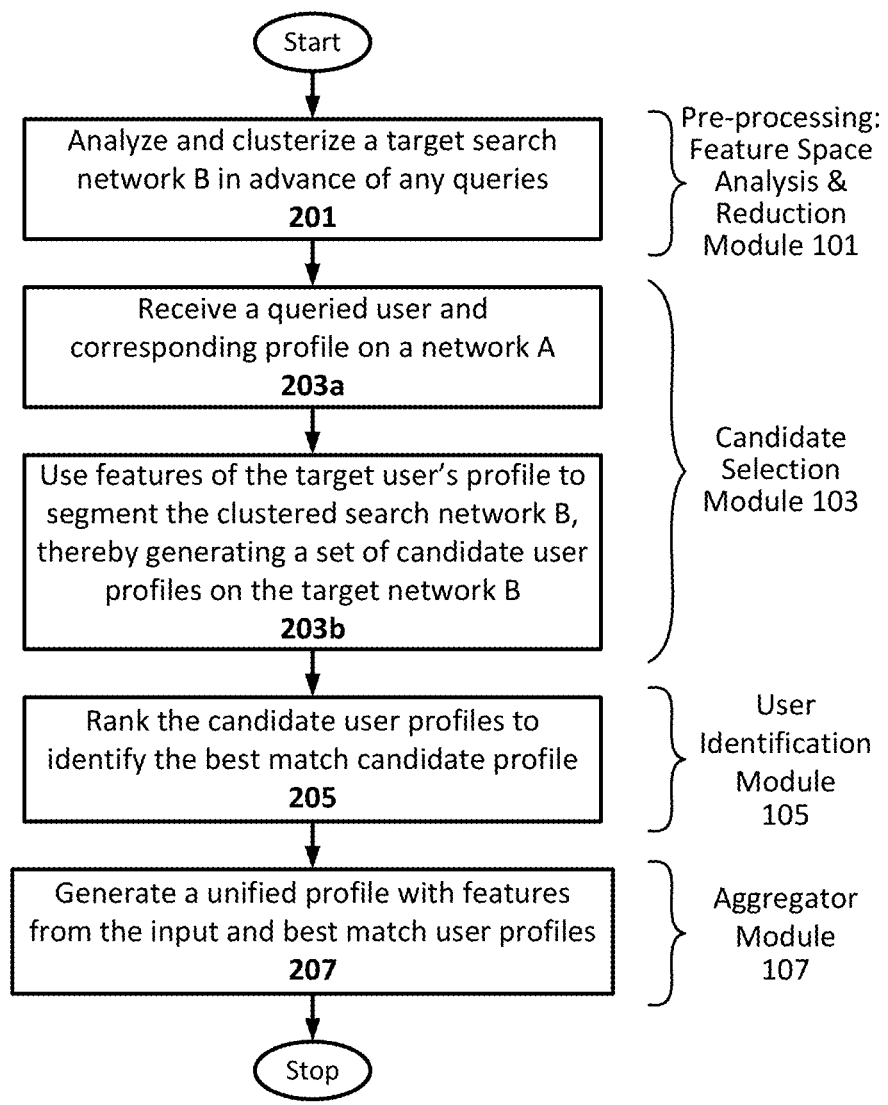
FIG. 2 illustrates a methodology for automatically generating a unified user profile, in accordance with an embodiment of the present disclosure.

FIG. 2 illustrates a methodology for automatically generating a unified user profile, in accordance with an embodiment of the present disclosure. As can be seen, the methodology can be carried out by the user profile aggregation system 100 discussed with reference to FIG. 1, and the flow chart of FIG. 2 is annotated with the modules/components that can carry out each part of the flow, in one example embodiment. However, other embodiments may carry out the methodology using different structures but still provide overall similar functionality, as will be appreciated in light of this disclosure.

The method includes analyzing and clusterizing 201 a target search network B. As can be seen, this functionality can be carried out, for example, by the pre-processing block 101 in advance of any queries being received by the system 100. At a high level, this pre-processing focuses on identifying relevant features for identity aggregation analysis, and in one specific embodiment focuses on feature availability, relevancy, and redundancy in user-related features. As will be appreciated in light of this disclosure, once the user profile features of a given network are identified and analyzed, that network can then be clusterized to facilitate the segmenting process performed at 203 of FIG. 2 to identify candidate user profiles. As will be further appreciated, this intermediate identification of candidate user profiles at 203 reduces the computational overhead for the subsequent user identification process performed at 205 of FIG. 2 where a so-called best one of the candidate user profiles is identified. A unified profile can then be generated using features from the input and best match user profiles, as indicated at 207 of FIG. 2. Each of these functions at 201 through 207 will now be discussed in greater detail.

A detailed description of the feature analysis and clustering processes provided by the pre-processing block 101 is now provided with reference to FIG. 3. FIG. 3 shows a list of user profile features that can be used in one example embodiment, along with the availability of those features across four different networks. As can be seen, the features generally include two types: profile features and content features. Each type includes a number of raw features. Examples of each will now be discussed in turn, with further reference to the example embodiment shown in FIG. 3. The four networks can be any online communication networks that allow for public accessibility of user profiles or individual user features, at least to some to some extent. In one example scenario and for purposes of the discussion provided herein, assume the four networks are: Twitter®, Facebook®, Quora®, and LinkedIn®, respectively. Numerous other communication networks will be apparent, and the techniques provided herein can be used with any such networks.

Profile Features: Users create multiple online profiles to exploit varied services from different communication or so-called social networks. Profile characteristics or features of the user tend to be consistent across such networks. The example raw features used in the example embodiment of FIG. 3 include username, name, location, biography (bio), profile image, gender, and language. Such typically invariant profile features can be used to capture characteristic properties of the user. To this end, the profile features can be used in the analysis carried out at 201 of FIG. 2 by module 101a of the pre-processing stage 101, in accordance with an embodiment. Each feature analysis will now be discussed in turn, in accordance with an example embodiment.

a. Username and Name: Username is a unique attribute of the user. It is theorized that 30% to 40% of users choose similar usernames across networks. Name, on the other hand, is not enforced to be unique. The value of the name attribute is completely at the user's disposal, however, only a few social networks (e.g., such as Facebook®) encourage the use of real names on the network. In one example embodiment, seven syntactic features are extracted for each of username and name.

Distance metrics such as Jaro distance, normalized longest common subsequence (LCS) length, Levenshtein distance, and length distance (also referred to as phonetic distance) are used. To capture a user's favoritism towards certain characters, Jaccard similarity coefficient between character unigrams (also referred to as char unigram Jaccard index), and cosine similarity between character bigrams (also referred to as char bi-gram Cosine similarity, or sometimes CosSim) are calculated. The keyboard distance (also referred to as entropy distance or Kbd distance) is used between the two usernames to identify typing errors made by the user. Similar features are derived for the name attribute. Thus, a total of fourteen features based on username and name of the user can be extracted, in accordance with an embodiment. In the example scenario depicted in FIG. 3, each of the four online networks allows such features to be extracted.

b. Location: Location of a user indicates the geographic places from which a user posts, or otherwise accesses the given network. Few networks allow access to the list of geographic locations to which the user has been, or to the most recent location of the user. Thus, to extract location, the location attribute of the user profile can be used. Alternatively, or in addition, the geographic location can be inferred based on geo-tagged posts of the user. The unique geographic locations of the user can be compared on the different networks (ratio of common locations). So, a list of locations known to be associated with the target user can be established, and extracted locations from candidate profiles can be compared to that list. As will be further appreciated, country names and postal codes, when available, can also be compared (ratio of common postal codes). In the example scenario depicted in FIG. 3, each of network #1, #3, and #4 allows such location data to be extracted, with network #4 actually allowing for the area name.

c. Bio: An online biography or so-called bio effectively provides a description of the user. So, two given profiles (one known to be the user and the other a candidate that may be the user) are compared on the bio attribute to understand if the user is consistent about the description across networks. Cosine similarity of bio words is used on the text after normalizing the content. The cosine similarity and Jaccard distance between bigrams can also be calculated. The distribution of part-of-speech tags (POS tag) can also be compared. As a bio is typically richer in text than other profile attributes, stylistic and writing patterns of the user can be extracted. So, features that can be calculated or otherwise extracted include the average length of words used, POS tag distribution, number of digits vs. characters, and number of spelling mistakes (e.g., using NodeBox). Thus, six features are extracted in all, in the example embodiment shown in FIG. 3, wherein each of network #1 (provides a description), #3 (provides an occupation and description), and #4 (provides a summary) provide relevant information.

d. Profile Image: Users oftentimes choose an image (e.g., personal picture of user, or representative icon) to show their identity. A comparison of profile images of the user across networks can help in identifying if the two profiles belong to the same user. Thus, in some embodiments, image histogram matching and face detection and matching are used to compare profile images. Histogram matching can be done, for example, by comparing RGB histograms of the image, and measuring the root mean squared distance. In the second method, face detection is done using scale-invariant feature transform (SIFT), and then detected faces are compared. Similar faces have a lower distance. Image metadata can also be used as a feature for the comparison. In the example scenario depicted in FIG. 3, each of the four online networks allows for profile images to be extracted.

e. Gender: Gender of a user is typically an invariable attribute. If the gender does not match, the possibility of two profiles belonging to the same person is low. In accordance with an embodiment, a Boolean attribute is extracted by comparing the gender across profiles, which holds true if the gender matches. For networks where gender is not accessible, the user's first name and/or sample texts can be used to derive the value. For example, Genderizer can be used, which is a publicly available application that is configured to detect gender by analyzing first names and/or sample texts. In the example scenario depicted in FIG. 3, only network #2 specifically provides gender information; the other networks could be explored with tools such as Genderizer.

f. Language: A user may choose to write posts or otherwise publish content in any language supported by the network. Two profiles which belong to same user are likely to have the same language preferences across networks. Thus, a Boolean feature which holds true if the profiles mention the same language attribute can be extracted, in accordance with an embodiment. In the example scenario depicted in FIG. 3, each of networks #1 and #2 specifically provides language information (e.g., posts published by user from network #1 indicate a language, and geographic location information in the user's profile from network #2 may also be used to infer a language (e.g., Madrid=Spanish).

Content Features: A user's interests on topics, as well as a user's language, writing style, and post patterns are typically invariant or otherwise consistent across multiple networks. These features rely on the user's posted content. To this end, the following content features can be used in the analysis carried out at 201 of FIG. 2 by module 101a of the pre-processing stage 101, in accordance with an embodiment.

a. Posts: A bag-of-words compare is carried out for a sample of the users' posts on each social network and the cosine similarity is calculated, such as can also be done for analyzing a given user's bio. Further, average length of words, average number of words, average number of misspelled words, distribution of part of speech (POS) tags, average number of URLs shared per post, average number of multimedia (e.g., emoticons, video, images, or other media) shared per post, and sentiment distribution of the posts are also derived.

b. Post—hour of the day: A user typically posts on a social network relative to his/her leisure time. A user's activity distribution reveals the time of the day while posting. Comparison of the posting behavior may help in understanding if the user is active on all networks at the same time. So, in an embodiment, the number of posts in each hour of the day is extracted and the distributions extracted for different social networks are compared. For instance, Twitter® and Facebook® users can be analyzed for this feature. The user's pattern can be modeled based on a sample of his/her recent posts.

c. Device: Users access their social profiles through various devices. Social networks have applications for platforms such as iPhone, iPad, and Android. A device tag is associated with the post when a particular app is used through a specific device. So, these device tags can be compared to trace the user across different networks (device distribution). The Jaccard coefficient index can be calculated for devices used, in accordance with an embodiment.

d. Application: Social network aggregation services allow the user to access all networks through a single service (e.g., Twitterfeed™, Hootsuite®). When a user posts through these services a tag is attached to the post. So, this tag can be used to identify the services that the user uses to post on different platforms simultaneously (application distribution). Jaccard coefficient index is used as the metric here, in accordance with an embodiment.

To summarize, many available features (e.g., 33, as variously provided above, in accordance with some example embodiments) associated with the user profiles can be extracted. As will be appreciated in light of this disclosure, the feature availability module 101a can be programmed or otherwise configured to carry out this extraction process, in accordance with an embodiment. Other embodiments may use a plurality of extraction modules to the same end. In any case, publicly available user features are located and extracted or otherwise harvested. Once the features are harvested, they can be provided to one or more feature relevancy modules 101b, which is programmed or otherwise configured to analyze the various features for relevance, which will now be discussed.

Figure 4:
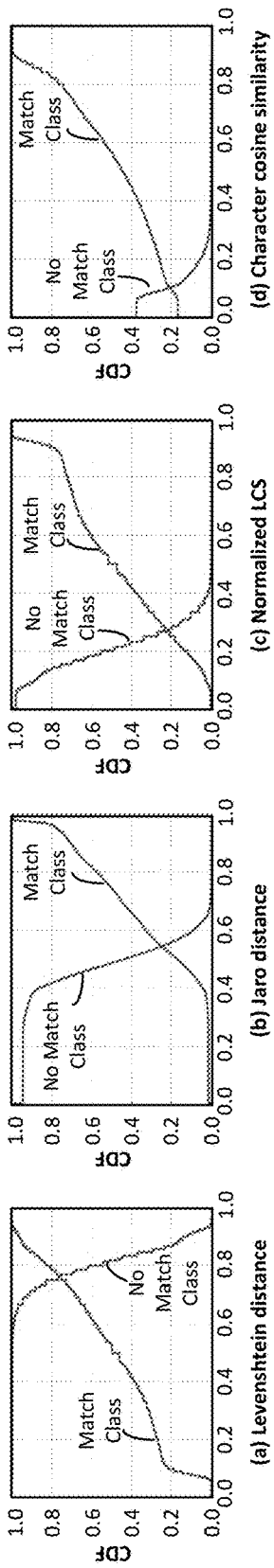
FIG. 4 shows the cumulative distribution of frequency (CDF) curves for different metrics for the relevant user profile feature of username, in accordance with an embodiment of the present invention.

Relevancy Analysis: Not all networks provide the complete set of features discussed with respect to FIG. 3. Also, each network has its own way of defining a certain feature. For example, on Twitter® a user profile has a bio, whereas on Quora® a user might have an occupation. To this end, the feature relevancy module 101b is configured to identify features that are comparable across user profiles. Comparability of a feature can be either approached in a heuristic manner or using domain knowledge. In accordance with an embodiment, heuristics with respect to a user feature type and feature content are used to identify whether the available user features are comparable. FIG. 3 also shows the comparable features. Further, because some features such as gender may not be discriminating across profiles, if is helpful to understand the behavior of each feature based on some known aggregated profile information. To identify the discriminative power of a feature, three metrics are defined that are calculated by processing pre-labelled ground truth data. As the purpose here is to find user profiles that belong to the same user, the available feature set is viewed as a two class problem. The first is the 'positive' or 'match' class representing the same user's different profiles, and the second is the 'negative' or 'non-match' or 'no match' class representing identities that belong to different users. The three metrics are defined as follows:

a. Class Majority Index: The purpose of this index is to empirically identify a threshold CMI(Feature) that acts a distinguishing point for the given user feature. For each feature, the CDF (cumulative distribution of frequency) is plotted individually for both classes. This gives information about the distribution of the feature values. The CMI(Feature) is defined as the intersection point of these graphs. Further, a feature is discriminative if CMI(Feature) is a point that divides the data such that, a majority (e.g., say majority≅80%, in one example case) of the data points on either side of CMI(Feature) belong to the same class. Features where this doesn't hold true are termed as non-discriminative. FIG. 4 shows the CDF curves for different metrics for username. The intersection point of the CDF curves signifies the class distribution at that particular distance. The Y axis shows the CDF. As can be seen in FIG. 4a, Levenshtein distance is discriminative as the intersection lies on (or close to) 0.8 on the CDF curve. Similarly, FIG. 4c shows that normalized LCS is also discriminative as the intersection lies on (or close to) 0.2 on the CDF curve (1.0-0.8).

b. Encroachment index: The majority index does not guarantee that the class is pure within a certain error bound. In other words, it may not be clear as to whether the relevant feature is discriminative enough to assure that at the extreme metric values for each class, samples from one class can be obtained. To this end, the encroachment index signifies how deep one needs to go into the opposite class to reach one-class purity. The encroachment index (EI(F)) is defined for each class as:

$$EI(F)_M = \frac{|\min(ClassNM) - CMI(\text{Feature})|}{|\min(ClassM) - CMI(\text{Feature})|}, \quad \text{(Equation 1)}$$

where min(ClassNM) is the minimum value that the feature takes for the encroaching class, and min(ClassM) is the minimum value that the feature takes for the calculating class. A similar approach can be used for the other class:

$$EI(F)_{NM} = \frac{|\min(ClassM) - CMI(\text{Feature})|}{|\min(ClassNM) - CMI(\text{Feature})|}. \quad \text{(Equation 2)}$$

This second index is helpful for the following reason. Assume a threshold is defined and 20% of the user-pairs of the non-match class are above that threshold. If it is concluded that the non-match class completely encroaches into the match class, then this means that some fraction of the number of non-match pairs had values equal to the highest (or for some metrics, the lowest) value of the match pair. This could be an indicator of the metric not being discriminative. For some features, the range of each class might be the same but the distribution of data across classes on either side of CMI(Feature) would differ. In this case, EI(F) is modified to capture the difference in the standard deviation and variance of the data distribution rather than just the range alone.

c. Content Impurity Index: Assume that the actual number of users that might overlap beyond the CMI(Feature) in the opposite class is not yet captured. Hence, a measure is introduced that captures the proportion of users within a class region that belong to the other class. To this end, the content impurity index is defined as:

$$CII(\text{Feature}) = \text{Max}(\text{Term}(M), \text{Term}(NM)), \quad \text{(Equation 3)}$$

where $$\text{Term}(M) = \frac{\text{Users}[\min(ClassNM, CMI(\text{Feature}))]}{\text{Total}(ClassM)}$$

-continued $$\text{Total}(ClassM) = \text{Users}[\min(ClassNM, CMI(\text{Feature}))] +$$
$$\text{Users}[\min(ClassM, CMI(\text{Feature}))]$$

$$\text{Term}(NM) = \frac{\text{Users}[\max(ClassM, CMI(\text{Feature}))]}{\text{Total}(ClassNM)}$$

$$\text{Total}(ClassNM) = \text{Users}[\max(ClassM, CMI(\text{Feature}))] +$$
$$\text{Users}[\max(ClassNM, CMI(\text{Feature}))]$$

As will be appreciated in light of this disclosure, MAX captures the higher impurity among the two classes. Ideally CII(Feature)=0. Another way to measure the metric is by comparing the data points on either side of the CMI as a Loss/Profit ratio. Here, loss is the user-pairs in the no match class (NM) above CMI, and profit is the user-pairs in the match class above this threshold (M). Consider, for example, NM=M, then NM/M=1 and this indicates a highly impure collection. Another way this can be viewed is if a random pair of users having username above this threshold is given. The probability of this pair belonging to the match class is same as that of belonging to the non-match class. A small value of NM=M indicates that the feature is relevant. Since, it implies that for a user-pair having username above that threshold, there is a high probability that they belong to the match class. Also note that, in case of skewed data (where NM is very big as compared to M), NM/(NM+M) is viewed instead. Tables I and II show the relevant features based on this index, in accordance with an example embodiment.

TABLE I

Most Relevant Features on the Basis of NM/M

| Feature | Threshold | $\frac{NM}{M}$ | $\frac{NM}{NM+M}$ |
|---|---|---|---|
| Name Leven | 0.85 | 6.47E − 05 | 1.850483729 |
| Name Leven | 0.8 | 6.88E − 05 | 1.800351803 |
| Name CosSim | 0.9 | 0.004483 | 0.004462915 |
| Name Phonetic | 0.85 | 0.004741 | 1.850483729 |
| Name Kbd dist | 0.85 | 0.004743 | 1.850088183 |

TABLE II

Most Relevant Features on the Basis of NM/(NM + M)

| Feature | Threshold | $\frac{NM}{M}$ | $\frac{NM}{NM+M}$ |
|---|---|---|---|
| Name CosSim | 0.9 | 0.004482922 | 0.004462915 |
| Name Jaro | 0.85 | 0.004746043 | 0.004723624 |
| Name LCS | 0.85 | 0.009492086 | 0.009402833 |
| Name Jaccard | 0.85 | 0.014238129 | 0.014038250 |
| Name Jaro | 0.9 | 0.017926402 | 0.017610706 |

All the definitions here assume that the higher the value of the distance metric, the user pair is less likely to match. In case of features with an inverted relationship (non-match=0), all max values can be inversed to min, and vice-versa.

Redundancy Analysis: Relevant features mark their importance on decision for a profile pair under observation. But, some features might be interdependent and hence give redundant information. To this end, correlation-based feature redundancy tests are performed, in accordance with an embodiment. In this analysis, two features, $f_i$ and $f_j$, are considered to determine if there is some dependency. A joint frequency distribution is plotted between each value that $f_i$ can take and each value that $f_j$ can take. From this joint frequency distribution, the joint probability distribution is determined. Consider, for instance, the following example. The joint probability distribution between gender and posts is calculated. The intuition behind this is to draw inferences of the form, 'do girls talk about certain topics, say Justin Bieber?'. This form of analysis could be used in the following ways:

a. A very high probability of the two features taking certain values would indicate high degree of correlation and suggest dependency. This could then be used in supervised models as provided herein to ensure that the models are only trained with independent features. So, say 'Female' and 'Justin Bieber' had a high probability of occurring together and 'Male' and 'football' had a high probability of occurring together. This would imply that the content of posts is dependent on the gender and hence both should not be used in conjunction in the supervised models.

b. A very high probability of certain feature values occurring together does not imply such a dependency but may still be used in the searching at 203b. To understand this, consider the following example. Say that the occurrence of gender 'Female' and content 'Justin Bieber' is highly likely. This does not imply feature dependence since no similar results have been found for the gender 'Male'. Hence it cannot be concluded that features gender and content are related. However, in the subsequent searching for candidate user profiles at 203b of FIG. 2, say the target user profile that is being searched for has a gender value of 'Female'. In such a case, the results obtained above can be used to expand the candidate set by looking for users talking about 'Justin Bieber'.

In other embodiments, it may make more sense to represent what users are talking about at a higher level of granularity (sports' rather than the specific sport of 'cricket') and then execute the feature redundancy analysis provided herein. The aim then could be to make statements of the form 'Given two user profiles having the same gender, what is the probability they talk about similar things?'. Another interesting form could be 'Given that the two users talk about similar things, what is the probability that they have the same gender?'. The answers to both of these questions could be used in the searching at 203b to identify potential matches to the target user profile. As will be further appreciated in light of this disclosure, such dependencies may generally require large amounts of data to present themselves. To this end, such patterns may only emerge on very large datasets. Hence, some datasets may be too small to capture such dependencies.

Clustering: Once a list of relevant features and various measures associated with these features is obtained via execution of the feature availability module 101a and feature relevancy module 101b, the search network can be clusterized to reduce the search burden ultimately carried out by the candidate selection module 103. The clustering module 101c is programmed or otherwise configured to perform this clustering task. In one example embodiment, once module 101a identifies user features of a given search network and module 101b analyzes those features for relevance, module 101c carries out clusterization of that search network feature set as an intermediate step before the search is executed by module 103, and in some such embodiments even before the search is requested. This intermediate clustering process is described here. As previously explained, relevant user profile features include, for example, name and username. These particularly relevant user profile features can be used for clustering, in accordance with an embodiment. In one specific case, an approach based on canopy clustering is utilized. Canopy clustering was generally developed to reduce the computational overhead in clustering and processing large scale data, and uses two thresholds to define clusters. Said differently, the purpose of traditional canopy clustering is to create canopies based on two thresholds along the varied feature distances specified. In accordance with an embodiment, the Jaro distance is used as the clustering measure. The canopy clustering process is generally defined as follows:

a. U←set of user profiles on the network;
    b. $T_1$←loose threshold;
    c. $T_2$←tight threshold;
    d. d(x; y)←distance measure;
    e. for each user profile x in U:
      create canopy $C_x$ such that for each user profile y in U: insert y into $C_x$ if d(x, y)¡ $T_1$;
    f. for each user profile y selected in the previous step remove y from U if d(x, y)¡ $T_2$.

The clustering process when translated to the present disclosure relies on two interpretations:

a. Identifying thresholds $T_1$ and $T_2$; and
    b. Cluster centroid: Canopy clustering is a distribution based clustering process and hence does not have an inherently defined cluster centroid. In the present disclosure, as this is an intermediate step towards matching, the cluster centroid is defined to understand the belongingness of a given user profile.

Thresholds $T_1$ and $T_2$ are usually defined based on domain knowledge. Here, as previously mentioned, the Jaro distance can be used as the similarity measure, and thresholds $T_1$ and $T_2$ can be empirically fixed such that $T_1=0.9$ and $T_2=0.7$, in an embodiment. Algorithmically, this can be interpreted as two user profiles would be interpreted in the same cluster if their name (or username) has a metric value greater than $T_2$. Instead of relying on domain knowledge, the data distribution can be analyzed before choosing the threshold values, in accordance with an embodiment.

To this end, results of the feature relevancy analysis provided by module 101a and 101b of pre-processing block 101 can be used to determine thresholds $T_1$ and $T_2$. Ideally, the existence of a single threshold above which all user profiles are in the match class and below which all user profiles do not match would be most suitable for the approach. However, this sort of threshold does not exist. So, an 85% percentage measure is chosen to define thresholds, in accordance with an embodiment. The relevancy metrics are used here. FIG. 4b shows the plot for username across the match and the non-match class using Jaro distance measure for user profiles on network #1 (Twitter®) and network #3 (Quora®). As is clear from the plots, for close to 80% of user profiles, the Jaro distance between usernames is greater than 0.56. For the no match class, on the other hand, the findings show that around 80% of the user profiles in the no match class have a Jaro similarity lesser than 0.56. Hence, 0.56 was chosen as the threshold for comparing usernames across network #1 and #3. A similar analysis can be carried out for all pairs of networks and all metrics.

Each pair of networks has different thresholds. This follows from the fact that there are some networks where users are more likely to give their accurate name than in others. The calculated threshold in the case of network #2 (Facebook®) and network #4 (LinkedIn®) is 0.9. This value is high as both these networks are used to maintain a friend network (Facebook®) and a professional network (LinkedIn®) where name is a particularly relevant attribute. In the case of Twitter® the threshold is lower, such that for the same dataset the threshold is 0.8. This is lower because such a network may not always be used for official purposes and users might therefore use nicknames nick and acronyms as their name attribute.

Modification to the Canopies. As explained above, traditional canopy clustering produces overlapping clusters, and is thus $O(n^2)$ in both time and space complexity. Thus, a modified canopy clustering process is provided herein that uses a single threshold and produces non overlapping clusters, in accordance with another embodiment. The space complexity now decreases to $O(n)$. The searching procedure at 203b is also altered accordingly. In particular, the concept of sibling clusters is introduced. As non-overlapping clustering tends to miss out some probable candidates, extending this constrained set with siblings results in higher accuracy. The searching procedure will be discussed in more detail with respect to step 203b of FIG. 2. The modified canopy clustering process is similar to traditional canopy clustering in that its time complexity is still $O(n^2)$ in the worst case. However, since clusters are non-overlapping, space complexity is now $O(n)$. The modified canopy clustering process that can be executed by module 101c to clusterize the output of the module 101b is as follows, in accordance with an embodiment of the present disclosure.

a. U←set of user profiles on the network;
    b. T←threshold;
    c. d(x, y)←distance measure;
    d. for each user profile x in U:
      create canopy $C_x$ such that for each user profile y in U: insert y into $C_x$ if d(x, y)¡ T;
    e. remove all user profiles y added in the previous step from U;
    f. loop while U is not empty.

Figure 5:
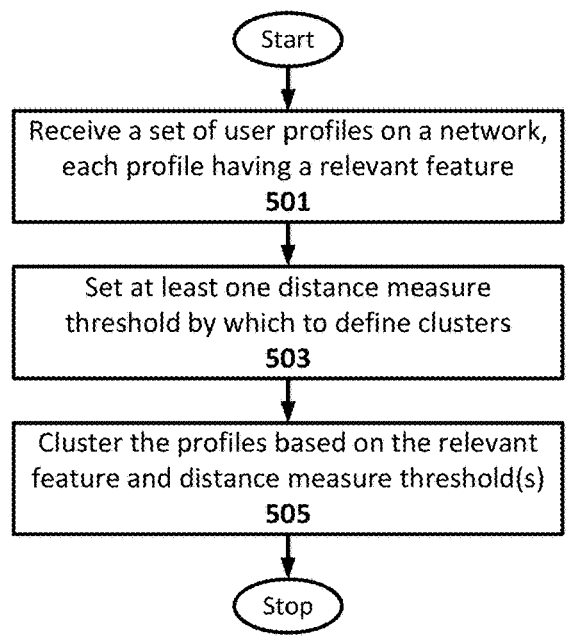
FIG. 5 illustrates a methodology for clustering a target network, in accordance with an embodiment of the present disclosure.

As will be appreciated, either traditional canopy clustering (overlapping clusters) or modified canopy clustering (non-overlapping clusters) may be carried out on a given search network, depending on factors such as the size of the network and accuracy goals of the profile aggregation process. In any case, once a given network is clusterized, it is available for candidate searching, as will now be discussed. FIG. 5 summarizes the clustering process that can be carried out by the clustering module 101c, to clusterize a given target network, in accordance with an embodiment of the present disclosure. As can be seen, the clustering methodology includes receiving 501 a set of user profiles on a network, each user profile having at least one relevant feature (e.g., username, name, or other relevant user features identified by module 101b). The method further includes setting 503 at least one distance measure threshold by which to define clusters. The method continues with clustering 505 the profiles based on the relevant feature and distance measure threshold, such that user profiles having a like value for the given at least one relevant feature are clustered or otherwise grouped together. The resulting clusters may be computed in advance and stored for further reference. In one such case, the clusters are stored in a cloud-based storage, and are periodically updated. A cloud-based storage can be any remote storage accessible to one or more client computing systems by, for instance, a server communicatively coupled to the Internet and configured to execute or otherwise support an automatic user profile aggregation service as provided herein. As previously indicated, traditional canopy clustering utilizes two thresholds and produces overlapping clusters, while the modified canopy clustering process provided herein uses one threshold to produce non-overlapping clusters. Numerous variations on this methodology will be apparent in light of this disclosure.

Candidate Selection. Once the clusters of the search network (say, network 8) are obtained, that network can be efficiently searched to identify candidate user profiles that might be a match to a given target user. To this end, and with further reference now to FIG. 2, the methodology continues with receiving 203*a* a queried user and corresponding profile on a network A, and using 203*b* features of the target user's profile to segment the clustered search network 8, thereby generating a set of candidate user profiles on the target network 8. Note that at least some of the clusters of network 8 will include multiple user profiles, thus providing a reduced search space. This process can be carried out by the candidate selection module 103, as will be appreciated, although other embodiments may have such functionality attributed to one or more other modules, as the case may be. In operation, the candidate selection process at 203*b* executes to find an appropriate cluster for the input query user profile a on network A. So, given a user profile U on a network A, who is the target or query user, the goal is to identify a corresponding cluster or candidate subset for this user profile on network 8. Canopy clustering is applied to the search network 8 and hence a set of overlapping (or non-overlapping, as the case may be) clusters is created for this network. As will be appreciated in light of this disclosure, two sub-problems include: A. Identifying the center of the cluster; and B. Determining the distance measure of user profile U from the cluster centroid, each of which will now be discussed in turn.

A. Identify cluster centroid (representative center of the cluster): For numerical data, mean of all points in a cluster is a standard way to identify the cluster center. However, for string-based data such as names and usernames, which are particularly relevant features as previously explained, defining such measures is non-trivial. Consider, for example, a cluster that consists of the following usernames: Adam, Adder, and Alan. The problem is how to define a representative of this cluster. The center of the cluster can be defined as the average frequency distribution of characters of each member of the cluster. In this example, the centroid is a frequency distribution determined in the following manner.
  a. Let the overall number of user profiles in the cluster be denoted by N.
  b. Select a character that appears in at least one user profile in the cluster. For instance, start with character 'a'.
  c. Count the occurrence of this character across all members of the cluster. Here 'a' appears twice in 'adam', once in 'adder' and twice in 'alan'. So five times in all.
  d. Divide this number by N to get the average representation. In this example case: 5/3=1.67.
  e. Repeat (b)-(d) for all the characters that appear in at least one user profile in the cluster.

Mathematically, a centroid is considered to be equivalent to a D-dimensional point where D is equal to the cardinality of the alphabet under consideration. Assuming the English alphabet, D equals 26. So, figuring out the value of the $i^{th}$ coordinate of the centroid is equivalent to determining the average frequency of the $i^{th}$ character of the alphabet (i=1 corresponds to the character 'a' in the English alphabet). The formula for determining the value of this $i^{th}$ coordinate is as follows:

$$C_i = \sum_{j=1}^{N} \frac{f_{ij}}{N} \quad \text{(Equation 4)}$$

where $f_{ij}$ is the frequency of the $i^{th}$ character in the $j^{th}$ member of the cluster, and N is the total number of members in the cluster.

B. Distance measure of user profile a from the cluster centroid: In order to determine the appropriate cluster for the user profile a, the square of the Euclidean distance between the frequency distribution of the user being searched for and each cluster representative is computed. The cluster at the minimum distance is then chosen as the suitable cluster, and all the user profiles in this cluster are added to the candidate set. For example, as previously explained, each centroid may be represented by a 26-dimensional point. The user profile for which the cluster is to be found is also converted to a 26-dimensional representation. So, for example, Adam would be represented as a point with a=2, d=1 and m=1. The clustering methodology stated below takes the example for 3-dimensional points. As will be appreciated in light of this disclosure, this methodology can be readily extended to D-dimensional points.
  a. Say, the user profile is represented as (1,1,1). Further assume there are three clusters $C_1$, $C_2$, and $C_3$ with centroids as (1,0,1), (2,0,0), and (1,3,4), respectively.
  b. Consider cluster $C_1$. Compute the distance as a square difference. In this case, it would be equal to $[(1-1)^2+(1-0)^2+(1-1)^2]=1$.
  c. Repeat (b) for each cluster.
  d. Determine the cluster that has minimum or closest distance to the target user a. This cluster is identified as the most suitable cluster for the given target user profile a. In this example case, $C_1$ would be the most suitable cluster. The general formula to determine the distance between two D-dimensional points $p_1$ and $p_2$ is given as follows:

$$\text{Distance} = \sum_{i=1}^{D} (p_{i1} - p_{i2})^2$$

Where $p_{i1}$ and $p_{i2}$ denote the value of the $i^{th}$ coordinate for points $p_1$ and $p_2$.

This process of finding the most appropriate or 'closest' cluster for profile a is repeated for each relevant feature (identified by 101*b*) on which clusters in network B have been made. As explained in the example, the most suitable cluster can be found for user profile Adam on each relevant feature. This yields a set of overlapping clusters $C_1, C_2, C_3, \ldots, C_m$. The procedure then takes a union of all the user profiles in each most appropriate cluster to determine a candidate set $C \subseteq P$ (as previously defined) for the Adam on search network B. Say, for example, $C_1$ has user profiles 'Amy' and 'Andy', $C_2$ has 'Belford' and 'Alan', and $C_3$ has 'Jack' and 'Andy'. Then the procedure continues with taking a union of all of these clusters and the final candidate set consists of the user profiles 'Amy', 'Andy', 'Belford', 'Alan', and 'Jack'. Note that reference to user profile 'John' on network B is actually a reference to the user with username 'John' on network B. This is because on any social network, the username is guaranteed to be unique. Mathematically, if R is the set of relevant features from feature analysis at 201, then :=$U_{r \in R} A_r$, where $A_r$ is the set of profiles in the most appropriate cluster with respect to relevant feature r∈R. This embodiment employing traditional canopy clustering is suitable with a predefined user profile list that is not too large. But for larger networks, it may not scale due to the space complexity of $O(n^2)$. Thus, a modified canopy clustering process is provided herein that uses a single threshold and produces non-overlapping clusters, in accordance with another embodiment.

For modified canopy clustering, the process at 203b to find the candidate set of user profiles corresponding to a particular user profile is also modified. As previously explained, under an embodiment using traditional canopy clustering as previously explained, the process at 203b may be executed by identifying the closest cluster and determining the candidate set based on members of that closest cluster. With modified canopy clustering as provided herein in accordance with another embodiment, after the closest cluster is determined, siblings of this cluster are determined. These are clusters that are similar to the closest cluster. In particular, the distance of each other cluster to the initially identified closest cluster is evaluated and the so-called sibling clusters are those within a specific threshold of that closest cluster. After experimenting over a range of thresholds, it was found the best or otherwise acceptable results were obtained using a threshold T equal to 12. The distance of the target user profile a to these siblings is evaluated and the candidate set obtained thus far is expanded accordingly. In one such embodiment, to accommodate the modified clustering process (at 201, by module 101c), the candidate selection module 103 of FIG. 1 is configured to execute the following process (also 203b of FIG. 2).

a. U←set of user profiles on the network;
b. C←set of non-overlapping clusters;
c. T←threshold;
d. $d(C_x, C_y)$←distance measure;
e. for each cluster $C_x$ in C:
compute the distance $d(U, C_x)$
select cluster $C_m$ such that
  $d(U, C_m)$ is the minimum of all distances computed above, this is most suitable cluster
f. L←List of suitable clusters, initially empty;
g. for each cluster c in C:
if $d(C_m, C_x)$¡ T then
  if $d(U, C_x)$¡ T then
    append $C_x$ to L
h. L holds list of candidate clusters.

As can be seen, for modified canopy clustering, the process at 203b for finding the candidate set corresponding to a particular user profile is modified. In more detail, the distance measure $d(C_x, C_y)$ is calculated in the same manner as done with the traditional canopy clustering methodology, wherein each canopy $C_x$ is represented by its centroid (which as explained earlier can be, for instance, a 26-dimensional point). The square of the Euclidean distance between the points is then calculated to determine their distance. Once the candidate clusters are so identified, a union of the user profiles in candidate clusters is taken to get the candidate set on this feature (say $C_r$(r∈R)) as previously explained. This process is then repeated on each feature that has been clustered on, and a union of all the selected clusters is taken to give the final candidate set C:=$U_{r \in R} C_r$.

Figure 6:
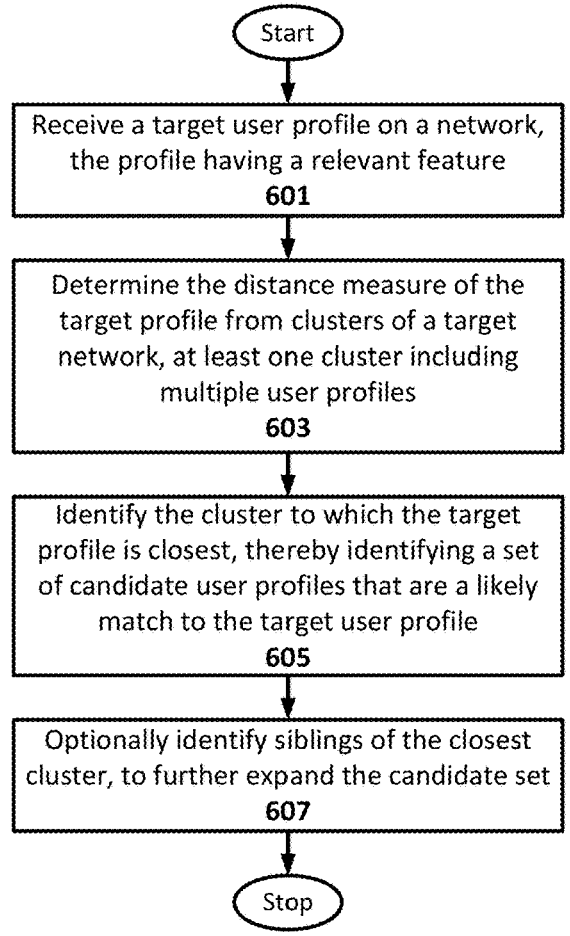
FIG. 6 illustrates a methodology for identifying a set of candidate user profiles on a pre-clustered target network for a given target user, in accordance with an embodiment of the present disclosure.

FIG. 6 summarizes the search process that can be carried out by the candidate selection module 103, to identify a set of candidate user profiles, in accordance with an embodiment of the present disclosure. As can be seen, the method includes receiving 601 a target user profile on a network, the profile having at least one relevant feature (e.g. username, name, or other relevant features, such as those shown in FIG. 3). The method continues with determining 603 the distance measure of the target profile from the centroid of each cluster of a target network, wherein each cluster includes one or more potential candidate user profiles. This determining can be carried out, for instance, by segmenting the target clustered network using the relevant feature as a query. The method continues with identifying 605 the cluster to which the target profile is closest, thereby identifying a set of candidate user profiles that are a likely match to the target user profile. The method may further include optionally identifying 607 sibling clusters of the closest cluster, to further expand the candidate user profile set. As previously explained, the sibling clusters are particularly useful when a modified canopy clustering process is used to clusterize the target network. Numerous variations on this methodology will be apparent in light of this disclosure.

Once the candidate set C containing all user profiles which are likely to be of the same user U whose profile a on network A is known, the methodology continues with ranking the set, so as to identify a single match user for the query user. In particular, and with further reference to FIG. 2, the methodology continues with ranking 205 the candidate user profiles to identify the best match candidate profile. The process can be carried out by the user identification module 105, but again other embodiments may use another structure to execute similar functionality. As previously discussed, every network generally comes with its own properties hence, there is a possibility that the feature values from various sources conflict. In accordance with one example embodiment, the ranking process is configured to first assign match probabilities (scores) to each user profile in the candidate set for the query user, and then to identify the best match based on the scores assigned. This process is summarized in FIG. 7, in accordance with an embodiment.

Figure 7:
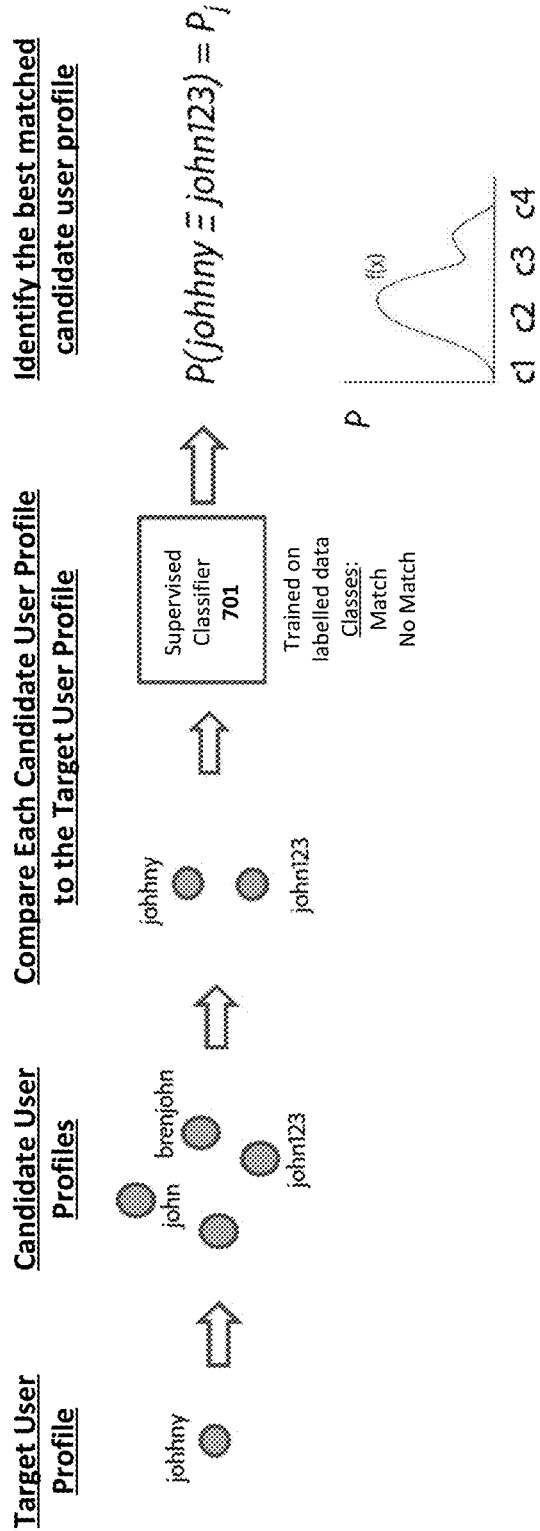
FIG. 7 illustrates a methodology for ranking a set of candidate user profiles, configured in accordance with an embodiment of the present disclosure.

As can be seen in this example embodiment of FIG. 7, the candidate user profiles are ranked using the probabilities generated using a supervised classifier 701 trained on labelled data with two classes: positive class and the negative class. In one such embodiment, the classifier 701 is a random forest classifier, although other suitable classifiers such as the Naive Bayes classifier can be used as well as will be appreciated in light of this disclosure. The goodness of the classifier 701 can be evaluated based on ROC curves and precision-recall graphs. Thus, for example, for each c∈C, $f(c)$ is defined as the probability of match given by a random forest classifier, in one embodiment. In this way, the function f as previously defined is obtained. Once the probabilities P are assigned to each user profile in the candidate set, the matched identity can be selected. In one embodiment, this includes picking the best matched candidate identity. For instance, choose c* such $f(c^*) \geq f(c)$ for all c∈C and declare it as the user profile of the target user U on network B. Further, in some embodiments, a minimum threshold can be defined (e.g., min-thresh=0.7) as a minimum value of probability required for the best match user. So, for instance, if the $f(c)$ is less than 0.7, then it is fair to say that the profile does not have a match. As will be appreciated in light of this disclosure, the purpose of this threshold is to avoid forceful overfitting of un-matched user profiles.

Once the candidate set C is ranked, the methodology continues with generating 207 a unified profile with features from the input and best match user profile(s). The process can be carried out by the aggregator module 107, but again other embodiments may use another structure to execute similar functionality. In more detail, once a and c* are obtained as the user profile of user U on networks A and B respectively, a unified profile of the user can be created. As previously explained, feature values of the user across networks may conflict. For instance, assume a user has a location as United States on one network, and California on another network. Here, the location attributes conflict syntactically but not semantically. Scenarios where the user mentions her name as John Smith on one network while 'Green Eyes' on other network, the name attributes conflict syntactically and semantically. Such values need to be disambiguated and the correctness of the values needs to be verified. To this end, the aggregator module 107 may be configured to use heuristic rules for this disambiguation. To avoid missing out on relevant information the unified user profile is created by collating information from different networks for the same feature. In some embodiments, the candidate set C with likelihood function $f: C \rightarrow [0, 1]$ is also provided as the output for a human annotator to use for purposes of manually identifying the match profile and/or verifying the correctness of the system 100. As will be appreciated in light of this disclosure, the candidate selection output of module 103 can be interpreted as user segments based on the clustering features. For example, if candidate selection is run on demography, the clusters show the user profiles segmented by their demographic information.

FIG. 8 illustrates an example unified user profile, configured in accordance with an embodiment of the present disclosure. As can be seen, the example unified profile includes two profile images, pulled from two different networks. Also, the target user name (Rick James) and gender (male) are identified and set-off from the other aggregated profile features. The other profile features include three different flavors of geographic location pulled from two or more different networks. The general locale is the U.S., while at least one network specifically noted or otherwise indicated a location of Palo Alto, Calif. and another indicated the Silicon Valley area. Also indicated is a number of followers (e.g., Twitter®, LinkedIn®, etc), as well as a number of friend (e.g., Facebook®, etc). Also provided is a general description, such as might be provided on a network like Facebook® (Geek, Guitar player, etc). A headline is also provided, such as might be provided on some networks (e.g., Hardware engineer, etc). A more formal summary is provided that is likely pulled from a professional network, like LinkedIn® (Hardware engineer with deep . . . ). Another bio-like description is provided from another network (Owner and developer . . . ). An occupation and current employer are also provided, which may be pulled from a network like Quora® (Principle and Designer . . . ). So, the unified profile provides a more complete view of a potential customer such as Rick James, by aggregating publicly available online user profile features from multiple communication networks. A marketer can now better understand what might be important to that customer and target accordingly.

Example Computing System

Figure 9:
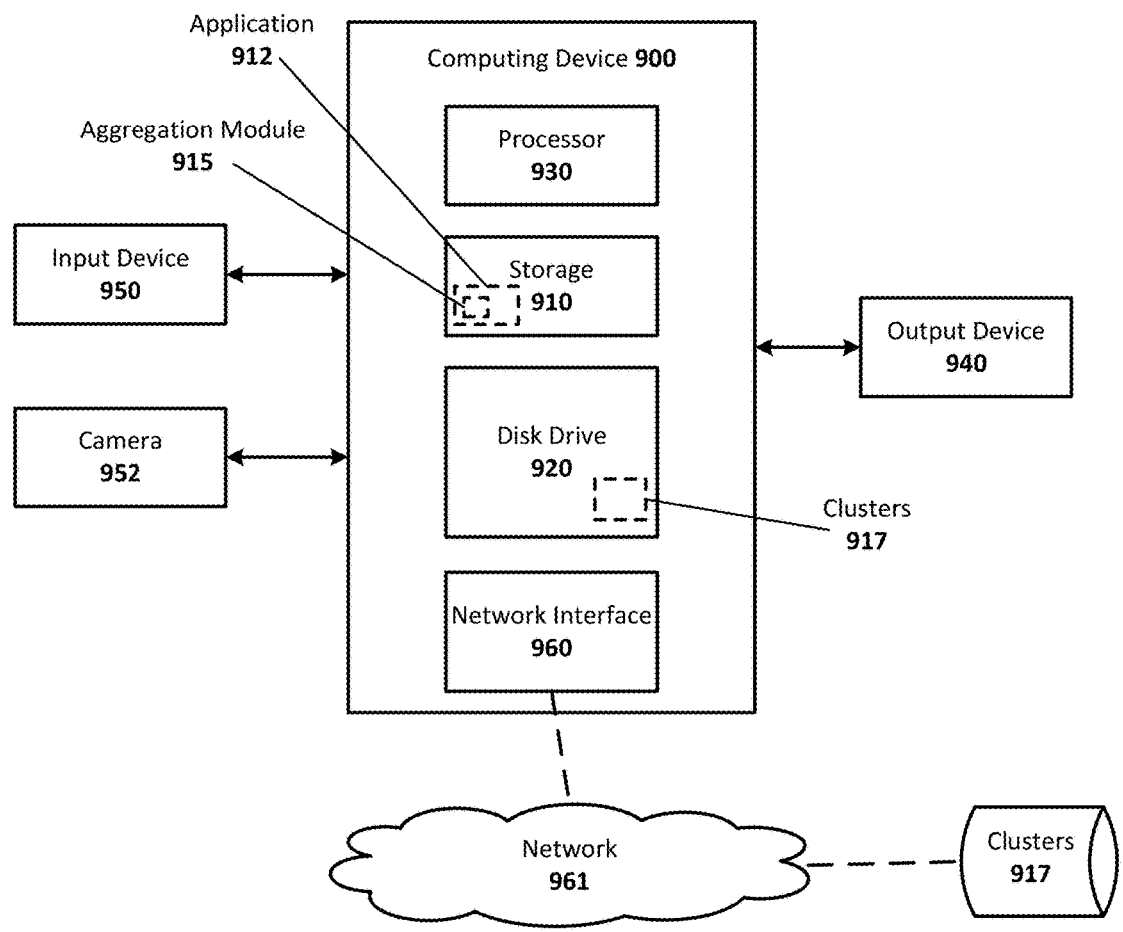
FIG. 9 illustrates an example computing system that includes a software application for automatically generating a unified user profile, in accordance with an embodiment of the present disclosure.

FIG. 9 illustrates an example computing system configured in accordance with an embodiment of the present disclosure. As can be seen, the computing device 900 includes at least one processor 930 for executing computer-readable and computer-executable instructions or software stored in the storage device 910 and disk drive 920 and other programs for controlling system hardware. In this example case, application 912 is stored in storage 910 and includes a user profile aggregation module 415, for aggregating user profiles and generating a unified view of a given target user as provided herein. As can be further seen, a database of clusters 917 may be provided on disk drive 920, but may also be accessible to the system 900 via a network 961, which may include, for example, a local area network (e.g., Wi-Fi network) and the Internet, although any suitable communication network can be used. Virtualization may be employed in the computing device 900 so that infrastructure and resources in the computing device 900 may be shared dynamically. For example, a virtual machine may be provided to handle a process running on multiple processors 930 so that the process appears to be using only one computing resource rather than multiple computing resources. Multiple virtual machines may also be used with one processor.

A user may interact with the computing device 900 through an output device 940, such as a touch-sensitive display screen or monitor, which may display content and one or more user interfaces, in accordance with an embodiment. In other embodiments, the output device 940 may be a non-touch display, such as a CRT display, LED, or flat panel display. The computing device 900 may also include other input devices 950 for receiving input from a user such as, for example, a keyboard, a joystick, a game controller, a pointing device (e.g., a mouse, a user's finger interfacing directly with a trackpad, etc.), or any suitable user interface. The computing device 900 may include other suitable conventional I/O peripherals, such as a camera 952 that can generate images. Any number of input/output schemes that allow a user to interact with the system 900 can be used.

The computing device 900 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 900 and performing the operations described in this disclosure. In an embodiment, the operating system may be run on one or more cloud machine instances.

As previously explained, the functional components/modules used to carryout user profile aggregation as provided herein may be implemented with software (as part of application 912, or otherwise executable by a call from application 912 or the operating system of device 900), hardware such as gate level logic (e.g., FPGA) or a purpose-built semiconductor (e.g., ASIC), or firmware (e.g., embedded routines of a microcontroller). In a more general sense, any suitable combination of hardware, software, and firmware can be used, as will be apparent. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 900, can be integrated into, for example, one or more desktop or laptop computers, workstations, tablets, smart phones, game consoles, set-top boxes, or other such computing devices. Other componentry and modules typical of a typical computing system, such as display drivers, graphics processor, and operating system, are not shown but will be readily apparent in light of this disclosure.

Example Embodiments

Numerous embodiments will be apparent, and features described herein can be combined in any number of configurations. One example embodiment of the present disclosure provides a computer-implemented method. The method includes a receiving a target user query including an online user profile on a network A, the user profile having a feature. The method continues with using the feature to segment a clustered target network B, at least one cluster including multiple user profiles each including one or more features, thereby generating a set of candidate user profiles on the target network B. The method continues with ranking, via a supervised classifier, the candidate user profiles included in the set, so as to identify a single match candidate user profile for the target user query. The method continues with generating a unified user profile that includes features from the user profile on network A and the single match candidate user profile on network B. In some cases, the method includes repeating the using, ranking, and generating for each of one or more additional networks, thereby further supplementing the unified user profile to further include features from at least one of the additional networks. In some cases, the method includes pre-processing network B, in advance of receiving the target user query, thereby generating a set of clusters including the at least one cluster including multiple user profiles. In one such case, the pre-processing of network B is carried out on a periodic basis. In another such case, the method further includes pre-processing one or more additional networks, in advance of receiving the target user query, thereby generating a set of clusters for each of those networks. In some cases, the candidate user profiles in the set from network B are included in a single cluster, or a single cluster and one or more sibling clusters, a sibling cluster being a cluster within a pre-established mathematical distance measure of the single cluster. In some such cases, each cluster of network B has a centroid having a mathematical distance from the user profile on network A, and the centroid of the single cluster is associated with the minimum of those mathematical distances. In some cases, the centroid of a given cluster is defined as the average frequency distribution of characters of a feature in each user profile of that cluster. In some cases, the mathematical distance is the square of the Euclidean distance between the frequency distribution of the user profile on network A and each cluster of network B. In some cases, the ranking includes assigning match probabilities (scores) to each of the candidate user profiles, and identifying a best match based on the scores assigned (the best match being the single match candidate user profile).

Another embodiment of the present disclosure provides a non-transient computer program product having instructions encoded thereon that when executed by one or more processors causes a process to be carried out. The process includes receiving a target user query including an online user profile on a network A, the user profile having a feature. The process further includes using the feature to segment a clustered target network B, at least one cluster including multiple user profiles each including one or more features, thereby generating a set of candidate user profiles on the target network B. The process further includes ranking, via a supervised classifier, the candidate user profiles included in the set, so as to identify a single match candidate user profile for the target user query. The process further includes generating a unified user profile that includes features from the user profile on network A and the single match candidate user profile on network B. In some cases, the process further includes repeating the using, ranking, and generating for each of one or more additional networks, thereby further supplementing the unified user profile to further include features from at least one of the additional networks. In some cases, the process includes pre-processing network B, in advance of receiving the target user query, thereby generating a set of clusters including the at least one cluster including multiple user profiles. In some cases, the candidate user profiles in the set from network B are included in a single cluster, or a single cluster and one or more sibling clusters, a sibling cluster being a cluster within a pre-established mathematical distance measure of the single cluster. In some such cases, each cluster of network B has a centroid having a mathematical distance from the user profile on network A, and the centroid of the single cluster is associated with the minimum of those mathematical distances. In some cases, the ranking includes assigning match probabilities (scores) to each of the candidate user profiles, and identifying a best match based on the scores assigned.

Another embodiment of the present disclosure provides a computing system. The system includes an electronic memory for storing executable instructions, and a processor configured to execute the instructions to: receive a target user query including an online profile on a network A, the user profile having a feature; use the feature to segment a clustered target network B, at least one cluster including multiple user profiles each including one or more features, thereby generating a set of candidate user profiles on the target network B; rank, via a supervised classifier, the candidate user profiles included in the set, so as to identify a single match candidate user profile for the target user query; and generate a unified user profile that includes features from the user profile on network A and the single match candidate user profile on network B. In some cases, the processor is further configured to execute the instructions to: pre-process network B, in advance of receiving the target user query, thereby generating a set of clusters including the at least one cluster including multiple user profiles; store the clusters in a cloud-based storage; and periodically repeat the pre-processing of network B to update the clusters in the cloud-based storage as needed. In some cases, the candidate user profiles in the set from network B are included in a single cluster, or a single cluster and one or more sibling clusters, a sibling cluster being a cluster within a pre-established mathematical distance measure of the single cluster. In some cases, each cluster of network B has a centroid having a mathematical distance from the user profile on network A, and the centroid of the single cluster is associated with the minimum of those mathematical distances. In some cases, the ranking includes assigning match probabilities (scores) to each of the candidate user profiles, and identifying a best match based on the scores assigned.

The foregoing description of example embodiments of the disclosure has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A computer-implemented method, comprising:
    identifying a first network A that comprises a first collection of user profiles, each of which is characterized by a value that is associated with a characteristic feature;

identifying a target network B that comprises a second collection of user profiles, each of which is characterized by a value that is associated with the characteristic feature;

setting a distance measure threshold AB that depends on a distribution of values for the characteristic feature in both the first network A and the target network B;

defining a plurality of user profile clusters in the target network B based on the characteristic feature and the distance measure threshold AB, wherein each of the user profile clusters comprises at least one of the user profiles in the target network B, and wherein each of the user profile clusters has a cluster centroid that is representative of the user profiles comprising the cluster;

after defining the plurality of user profile clusters, receiving a target user query that identifies a query user profile on the first network A, the query user profile having a query value associated with the characteristic feature;

identifying a particular user profile cluster in the target network B having a minimum distance from its respective cluster centroid to the query user profile, wherein the particular user profile cluster associated with the minimum distance establishes a set of candidate user profiles on the target network B;

ranking, via a supervised classifier, the candidate user profiles included in the set, so as to identify a first match candidate user profile for the target user query; and generating a unified user profile that includes (a) a first feature that is included in the query user profile on network A, and (b) a second feature that is included in the first match candidate user profile on network B.

2. The computer-implemented method of claim 1, further comprising:

setting a distance measure threshold AC that depends on a distribution of values for the characteristic feature in both the first network A and a target network C that comprises a third collection of user profiles;

defining a second plurality of user profile clusters in the target network C based on the characteristic feature and the distance measure threshold AC, wherein each of the user profile clusters in the second plurality comprises at least one of the user profiles in the target network C, and wherein each of the user profile clusters in the second plurality has a cluster centroid that is representative of the user profiles comprising the cluster;

identifying a second particular user profile cluster in the target network C having a minimum distance from its respective cluster centroid to the query user profile, wherein the second particular user profile cluster associated with the minimum distance establishes an additional set of candidate user profiles on the target network C;

ranking, via the supervised classifier, the candidate user profiles included in the additional set, so as to identify a second match candidate user profile for the target user query; and supplementing the unified user profile to further include a third feature from the second match candidate user profile.

3. The computer-implemented method of claim 1, further comprising, before receiving the target user query:

setting a distance measure threshold AC that depends on a distribution of values for the characteristic feature in both the first network A and a target network C that comprises a third collection of user profiles; and defining a second plurality of user profile clusters in the target network C based on the characteristic feature and the distance measure threshold AC, wherein each of the user profile clusters in the second plurality comprises at least one of the user profiles in the target network C, and wherein each of the user profile clusters in the second plurality has a cluster centroid that is representative of the user profiles comprising the cluster.

4. The computer-implemented method of claim 1, wherein the distance measure threshold AB is set and recalculated before receiving the target user query.

5. The computer-implemented method of claim 1, further comprising, before receiving the target user query, setting a distance measure threshold AC that depends on a distribution of values for the characteristic feature in both the first network A and a target network C.

6. The computer-implemented method of claim 1, further comprising identifying, from amongst the plurality of user profile clusters, a sibling cluster having a cluster centroid that is within a pre-established mathematical distance from the query user profile.

7. The computer-implemented method of claim 6 wherein the cluster centroid of the sibling cluster is mathematically closer to the query user profile than any of the other user profile clusters, other than the particular user profile cluster.

8. The computer-implemented method of claim 1, wherein the cluster centroid of the particular user profile cluster is defined as an average frequency distribution of characters of a particular feature in the particular user profile cluster.

9. The computer-implemented method of claim 1, wherein the minimum distance is a square of a Euclidean distance between an average frequency distribution of characters of the characteristic feature of the query user profile on the first network A and an average frequency distribution of characters of a corresponding feature in the particular user profile cluster.

10. The computer-implemented method of claim 1 wherein ranking includes assigning match probabilities to each of the candidate user profiles, and identifying a best match based on the assigned match probabilities.

11. A non-transient computer program product having instructions encoded thereon that when executed by one or more processors causes a process to be carried out, the process comprising:

identifying a first network A that comprises a first collection of user profiles, each of which is characterized by a value that is associated with a characteristic feature;

identifying a target network B that comprises a second collection of user profiles, each of which is characterized by a value that is associated with the characteristic feature;

setting a distance measure threshold AB that depends on a distribution of values for the characteristic feature in both the first network A and the target network B;

defining a plurality of user profile clusters in the target network B based on the characteristic feature and the distance measure threshold AB, wherein each of the user profile clusters comprises at least one of the user profiles in the target network B, and wherein each of the user profile clusters has a cluster centroid that is representative of the user profiles comprising the cluster;

after defining the plurality of user profile clusters, receiving a target user query that identifies a query user profile on the first network A, the query user profile having a query value associated with the characteristic feature;

identifying a particular user profile cluster in the target network B having a minimum distance from its respective cluster centroid to the query user profile, wherein the particular user profile cluster associated with the minimum distance establishes a set of candidate user profiles on the target network B;

ranking, via a supervised classifier, the candidate user profiles included in the set, so as to identify a first match candidate user profile for the target user query; and generating a unified user profile that includes (a) a first feature that is included in the query user profile on network A, and (b) a second feature that is not included in the first match candidate user profile on network B.

12. The non-transient computer program product of claim 11, the process further comprising:

setting a distance measure threshold AC that depends on a distribution of values for the characteristic feature in both the first network A and a target network C that comprises a third collection of user profiles;

defining a second plurality of user profile clusters in the target network C based on the characteristic feature and the distance measure threshold AC, wherein each of the user profile clusters in the second plurality comprises at least one of the user profiles in the target network C, and wherein each of the user profile clusters in the second plurality has a cluster centroid that is representative of the user profiles comprising the cluster;

identifying a second particular user profile cluster in the target network C having a minimum distance from its respective cluster centroid to the query user profile, wherein the second particular user profile cluster associated with the minimum distance establishes an additional set of candidate user profiles on the target network C;

ranking, via the supervised classifier, the candidate user profiles included in the additional set, so as to identify a second match candidate user profile for the target user query; and supplementing the unified user profile to further include a third feature from the second match candidate user profile.

13. The non-transient computer program product of claim 11, the process further comprising, before receiving the target user query:

setting a distance measure threshold AC that depends on a distribution of values for the characteristic feature in both the first network A and a target network C that comprises a third collection of user profiles; and defining a second plurality of user profile clusters in the target network C based on the characteristic feature and the distance measure threshold AC, wherein each of the user profile clusters in the second plurality comprises at least one of the user profiles in the target network C, and wherein each of the user profile clusters in the second plurality has a cluster centroid that is representative of the user profiles comprising the cluster.

14. The non-transient computer program product of claim 11, the process further comprising identifying, from amongst the plurality of user profile clusters, a sibling cluster having a cluster centroid that is within a pre-established mathematical distance from the query user profile.

15. The non-transient computer program product of claim 14 wherein the cluster centroid of the sibling cluster is mathematically closer to the query user profile than any of the other user profile clusters, other than the particular user profile cluster.

16. The non-transient computer program product of claim 11 wherein ranking includes assigning match probabilities to each of the candidate user profiles, and identifying a best match based on the assigned match probabilities.

17. A computing system, comprising:

an electronic memory for storing executable instructions; and a processor configured to execute the instructions to:

identify a first network A that comprises a first collection of user profiles, each of which is characterized by a value that is associated with a characteristic feature;

identify a target network B that comprises a second collection of user profiles, each of which is characterized by a value that is associated with the characteristic feature;

set a distance measure threshold AB that depends on a distribution of values for the characteristic feature in both the first network A and the target network B;

define a plurality of user profile clusters in the target network B based on the characteristic feature and the distance measure threshold AB, wherein each of the user profile clusters comprises at least one of the user profiles in the target network B, and wherein each of the user profile clusters has a cluster centroid that is representative of the user profiles comprising the cluster;

after defining the plurality of user profile clusters, receive a target user query that identifies a query user profile on the first network A, the query user profile having a query value associated with the characteristic feature;

identify a particular user profile cluster in the target network B having a minimum distance from its respective cluster centroid to the query user profile, wherein the particular user profile cluster associated with the minimum distance establishes a set of candidate user profiles on the target network B;

rank, via a supervised classifier, the candidate user profiles included in the set, so as to identify a single match candidate user profile for the target user query; and generate a unified user profile that includes (a) a first feature that is included in the query user profile on network A, and (b) a second feature that is included in the single match candidate user profile on network B.

18. The computing system of claim 17 wherein the processor is further configured to execute the instructions to: store the particular user profile cluster in a cloud-based storage.

19. The computing system of claim 17 wherein the processor is further configured to execute the instructions to identify, from amongst the plurality of user profile clusters, a sibling cluster having a cluster centroid that is within a pre-established mathematical distance from the query.

20. The computing system of claim 17 wherein ranking includes assigning match probabilities to each of the candidate user profiles, and identifying a best match based on the assigned match probabilities.

* * * * *

UNITED STATES PATENT AND TRADEMARK OFFICE
CERTIFICATE OF CORRECTION

PATENT NO. : 10,296,546 B2
APPLICATION NO. : 14/551365
DATED : May 21, 2019
INVENTOR(S) : Chhaya et al.

Page 1 of 1

It is certified that error appears in the above-identified patent and that said Letters Patent is hereby corrected as shown below:

In the Claims

Column 28, Line 60, Claim 19, please replace "from the query." with --from the query user profile.--.

Signed and Sealed this
Sixth Day of August, 2019

Andrei Iancu
*Director of the United States Patent and Trademark Office*